(No Model.)

J. G. SHAHFER.
KITCHEN CABINET.

No. 375,204. Patented Dec. 20, 1887.

WITNESSES:
J. H. Clark
C. Sedgwick

INVENTOR:
J. G. Shahfer
BY Munn & Co.
ATTORNEYS.

UNITED STATES PATENT OFFICE.

JOHN GEORGE SHAHFER, OF CLAY CITY, INDIANA.

KITCHEN-CABINET.

SPECIFICATION forming part of Letters Patent No. 375,204, dated December 20, 1887.

Application filed May 26, 1887. Serial No. 239,421. (No model.)

*To all whom it may concern:*

Be it known that I, JOHN GEORGE SHAHFER, of Clay City, in the county of Clay and State of Indiana, have invented a new and Improved Kitchen-Cabinet, of which the following is a full, clear, and exact description.

The object of my invention is to provide a new and improved kitchen-cabinet comprising a case provided with an extension-cupboard having centrally hung or pivoted safes, each constructed with semicircular sides and a semicircular back extending to within a short distance of the rear upper part of the front of the safe, said safes being adapted to effect the discharge of their contents without the use of a scoop or other means usually employed for that purpose, substantially as hereinafter more fully set forth, and pointed out in the claim.

Reference is to be had to the accompanying drawings, forming a part of this specification, in which similar letters of reference indicate corresponding parts in both the figures.

Figure 1:
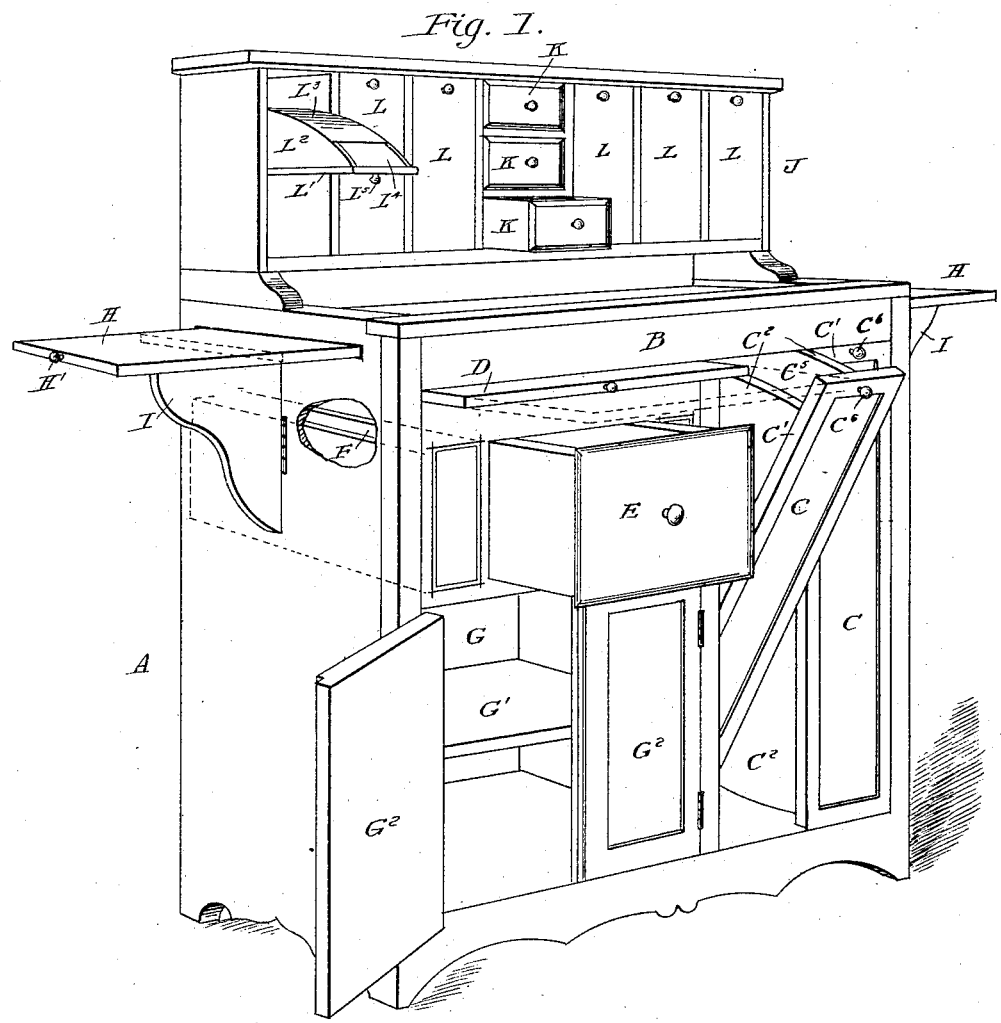
Figure 2:
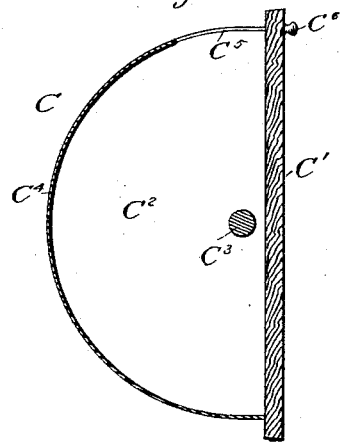

Figure 1 is a perspective view of my improvement with parts broken out, and Fig. 2 is a sectional side elevation of one of the revolving safes.

My improved kitchen-safe A is provided near its upper part with a water-sink, B, used for various purposes in the kitchen. Below the water-sink B, and on one side of the cabinet, are placed two flour-safes, C C, each consisting of a front, C′, supporting the two sides C², provided with trunnions C³, having their bearings in the sides of the cabinet A, so that the safe can be revolved in order to remove flour from the same without using a scoop or spoon. The sides C² are semicircular in form, and the back of the safe is formed by a semicircularly-shaped sheet-metal strip, C⁴, extending from the rear of the lower part of the front C′ over said sides C² and to within a short distance of the rear of the upper part of the front C′, so as to form an opening, C⁵, through which the flour is removed from or placed in the safe. Near the upper part of the front C′ is a knob, C⁶, for turning the safe on its trunnions C³ to let the flour out or shut the safe up.

Next to the flour-safes C, and directly below the water-sink B, is held to slide a dough-board, D, which can be drawn partly out of the kitchen-cabinet or removed entirely from the same and used on a table in the ordinary manner. Below the dough-board D is placed a large drawer, E, used for various purposes, and on each side of said drawer is placed a secret drawer, F, said drawers being covered up in front by the front of the kitchen-cabinet. The secret drawers F can only be reached by removing the drawer E entirely from the cabinet. Below the secret drawers F and the drawer E is a cupboard, G, provided with one or more shelves, G′, and the front doors, G², for closing the cupboard.

At each end of the cabinet, and below the water-sink B, is held to slide a board, H, provided with a knob, H′, and used as a table. The board H, when drawn out, is firmly supported by a bracket, I, hinged to the end of the kitchen-cabinet below the center of the board H. The bracket I can be folded over on the respective end of the kitchen-cabinet when the board H is moved inward, so as to occupy as little space as possible when not in use.

On top of the sink B, at the rear, is placed an extension-cupboard, J, provided in its middle with drawers K, placed one above the other and used for various purposes—as, for instance, brick-dust for scouring the cutlery, spoons, &c. On each side of the drawers K are arranged the revolving safes L, which are similar in construction to the flour-safes C, each being provided with a front, L′, supporting semicircular sides L², having trunnions fulcrumed in the ends and partitions of the extension J. The back of each revolving safe L consists of a sheet-metal piece, L³, forming an opening, L⁴, at the upper end of the front L′. A knob, L⁵, on the front L′ serves for turning the revolving safe, in order to remove the contents of said safe. The revolving safes L are used for storing cereals, spices, &c.

It will be seen that when it is desirable to remove substances from the revolving safes the operator turns the safe downward, so that the substance runs out of the opening in the top without using a scoop, spoon, or similar article.

Having thus described my invention, what I claim as new, and desire to secure by Letters Patent, is—

The kitchen-cabinet comprising the case provided with an extension-cupboard having centrally hung or pivoted safes, each constructed with semicircular sides and semicircular back extending to within a short distance of the rear upper part of the front of the safe, providing thereby the filling and discharging opening, each safe having movement whereby it is adapted to be revolved so as to bring its upper open end outward and downward to and below a horizontal position, substantially as and for the purpose set forth.

JOHN GEORGE SHAHFER.

Witnesses:
FRANK A. HORNER,
J. W. DANHOUR.